United States Patent [19]

Nishizawa et al.

[11] Patent Number: 6,153,295

[45] Date of Patent: *Nov. 28, 2000

[54] MAGNETIC RECORDING MEDIUM

[75] Inventors: Akinori Nishizawa; Kazushi Tanaka; Shuji Sakaguchi, all of Nagano, Japan

[73] Assignee: TDK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,370

[22] Filed: Mar. 27, 1997

[30] Foreign Application Priority Data

Mar. 29, 1996 [JP] Japan ................................. 8-077460

[51] Int. Cl.$^7$ ..................................................... G11B 5/702
[52] U.S. Cl. ........................ 428/323; 428/328; 428/425.9; 428/694 BU; 428/694 BG; 428/900
[58] Field of Search ............................ 428/425.9, 694 B, 428/694 BU, 694 BG, 694 BB, 900, 323, 694 BS, 522, 328

[56] References Cited

U.S. PATENT DOCUMENTS

| | | | |
|---|---|---|---|
| 5,527,603 | 6/1996 | Isobe et al. ............................. | 428/323 |
| 5,534,361 | 7/1996 | Hisano et al. ..................... | 428/694 RE |
| 5,652,320 | 7/1997 | Takemoto et al. ........................ | 528/71 |
| 5,714,275 | 2/1998 | Yamazaki et al. .................. | 428/694 B |

FOREIGN PATENT DOCUMENTS

| | | |
|---|---|---|
| 63-261523 | 4/1987 | Japan . |
| 6-010860 | 2/1994 | Japan . |

*Primary Examiner*—Stevan A. Resan
*Attorney, Agent, or Firm*—Oblon, Spivak, McClelland, Maier & Neustadt, P.C.

[57] ABSTRACT

In a magnetic recording medium which comprises a magnetic layer having magnetic metal powder and a binder as major components, the magnetic layer being disposed on one side of a non-magnetic support member, the binder comprises a vinyl chloride copolymer, a polyurethane resin having a group which contains metal sulfamate as a functional group, and a curing agent. The polyurethane resin comprises a group containing metal sulfamate by 0.5 to 3 per molecule, a blending weight ratio of the vinyl chloride copolymer and the polyurethane resin of 30/70 to 70/30, and the curing agent is present in an amount of 10 to 60 weight parts to 100 weight parts of the total of the vinyl chloride copolymer and the polyurethane resin. The invention also provides a magnetic recording medium which further comprises a non-magnetic underlayer and a backcoat layer, wherein a binder comprising polyurethane resin having a group which contains metal sulfamate also is used. The binder improves the dispersion property, coating material stability and coating material viscosity of the magnetic layer, non-magnetic underlayer and backcoat layer to improve the electro-magnetic characteristics of the magnetic recording medium.

2 Claims, No Drawings

MAGNETIC RECORDING MEDIUM

BACKGROUND OF THE INVENTION

The present invention relates to a magnetic recording medium, and in particular to a magnetic recording medium with improved electromagnetic characteristics and durability.

In recent years, the data recorded on magnetic recording medium has been increasingly digitalized to prevent deterioration of signals due to repeated copying or deterioration of picture quality or sound quality.

However, it is inevitably necessary to record data at higher density because of the enormous increase in the amount of data to be recorded in digital VTR, for example, and it is necessary to record the data in shorter wavelength. For this purpose, metal magnetic powder having finer highly saturated magnetic flux density is used as the magnetic powder. When such metal magnetic powder is used, the dispersion property, coating material (paint) stability and coating material viscosity of the magnetic power exerts extensive influence on the properties of the recording medium.

Specifically, if the dispersion property of the magnetic powder is low, the surface property and magnetic characteristics of the medium are decreased, and this leads to deterioration of electromagnetic characteristics (output, C/N, etc.). Also when the balance between coating material viscosity and yield value is turned toward lower leveling (i.e. higher yield value), the surface property of the medium is worsened and this leads to the results as described above. This also causes lower working efficiency in the manufacture of the magnetic recording medium.

Further, if the stability of the coating material is poor, the dispersion property and viscosity in the initial stage may not be maintained throughout the production process, and this also leads to the results described above.

To overcome these problems, it has been considered to use a binder, which has a functional group exhibiting high adsorbing property by magnetic powder.

More concretely, as disclosed in Japanese Patent Publication Laid-Open 63-261523, Japanese Patent Publication 6-10860, etc., the use of a binder having a polar function group such as —COOM, —SO3M, —OSO3M, etc. has been proposed.

For example, the following magnetic recording media have been proposed: a magnetic recording medium having a magnetic layer with ferromagnetic fine powder evenly dispersed in a binder, said magnetic layer being disposed on a non-magnetic support member, whereby said magnetic recording medium comprises ferromagnetic fine powder having BET of 45 m2/g, coercive force of not less than 1000 Oe and acicular ratio of not less than 7, and a binder having a polar group of —COOM, —SO3X, —OSO3X, —PO3X2 or —OPO3X2 and consisting of a polymer having a molecular weight of 10,000 to 100,000, whereby the weight ratio of the ferromagnetic fine powder to the binder is 1.5 to 10 (disclosed in Japanese Patent Publication Laid-Open 63-261523); or a magnetic recording medium comprising a non-magnetic support member and a magnetic layer disposed on said support member, said magnetic layer contains polyurethane resin and vinyl chloride copolymer, ferromagnetic metal fine powder containing iron, cobalt, nickel or an alloy of these metals and an abrasive material are dispersed in a binder consisting of a resin component, at least one of said resins has at least one type of polar groups of —COOM, —SO$_3$M, —OSO$_3$M, and —PO(OM')$_2$ [where M represents a hydrogen atom or an alkali metal atom, and M' represents a hydrogen atom, an alkali metal or a lower hydrocarbon] whereby said ferromagnetic metal fine powder contains an aluminum component by 1 to 6 weight % in the weight converted to metal (disclosed in Japanese Patent Publication 6-10860).

Although the dispersion property is improved when a resin containing the above polar functional group is used as a dispersion agent, the balance between coating material stability or coating material viscosity and yield value is not sufficient, and the product is not very satisfactory on these points.

In this respect, there have been strong demands for a magnetic recording medium, by which it is possible to improve dispersion property, coating material stability, and coating material viscosity of the magnetic recording medium using metal magnetic powder, and to improve electromagnetic characteristics and productivity.

To solve the above problems, the prevent inventors have found as a result of fervent study that the above object can be attained by a binder which contains metal sulfamate having a functional group, resulting in the present invention.

SUMMARY OF THE INVENTION

The present invention relates to: (1) a magnetic recording medium comprising a magnetic layer which contains metal magnetic powder and a binder, said magnetic layer being disposed on a non-magnetic support member, whereby said binder contains a vinyl chloride copolymer and a polyurethane resin having a group which contains metal sulfamate as a functional group, and a curing agent, said polyurethane resin contains a group having metal sulfamate by 0.5 to 3 per molecule, the blending weight ratio of said vinyl chloride copolymer and said polyurethane is 30/70 to 70/30, and said curing agent is present in 10 to 60 weight parts to 100 weight parts of the total of said vinyl chloride copolymer and said polyurethane resin; (2) a magnetic recording medium having a non-magnetic layer under a magnetic layer, said non-magnetic layer comprises a binder which contains a vinyl chloride copolymer, a polyurethane resin having a group containing metal sulfamate, and a curing agent; (3) a magnetic recording medium having a back-coating layer, whereby a binder, which has a polyurethane resins having a group containing metal sulfamate and a curing agent, is used in said back-coat layer; (4) a magnetic recording medium according to (1) above having a nonmagnetic layer under a magnetic layer, wherein a binder is used which contains a vinyl chloride copolymer, a polyurethane resin having a group containing metal sulfamate, and a curing agent; and (5) a magnetic recording medium as described in (1) or (4) above wherein there is provided a back-coat layer, and a binder which contains a polyurethane resin having a group containing metal sulfamate and a curing agent is used in said back-coat layer.

The magnetic recording medium of the present invention comprises a magnetic layer, a non-magnetic underlayer disposed under the magnetic layer and a back-coat layer, whereby a binder having polyurethane resin with a group containing metal sulfamate as a functional group and a curing agent is used in said back-coat layer.

Also, in the non-magnetic underlayer and the back-coat layer, the polyurethane resin preferably contains a group having metal sulfamate by 0.5 to 3 per molecule, the blending weight ratio of the vinyl chloride copolymer and the polyurethane resin is 30/70 to 70/30, and the curing agent is present in 10 to 50 weight parts to 100 weight parts of the total of the vinyl chloride copolymer and the polyurethane resin.

The binder in the non-magnetic underlayer and the back-coat layer may be used alone or in combination. In the non-magnetic underlayer and the back-coat layer containing the binders, favorable results can be obtained with any of the binders used in the magnetic layer. However, it is preferable to use the binder which contains a polyurethane resin having a group containing metal sulfamate, as described above, in the magnetic layer.

It is preferable that the metal magnetic powder used in the magnetic layer have a coercive force of not less than 1500 Oe, magnetic saturation σs of 120 emu/g, and specific surface area BET of not less than 45 m$^2$/g.

In the preferred aspect of the invention, the total quantity of the vinyl chloride copolymer and the polyurethane which has a group containing metal sulfamate as a functional group, is 10 to 50 weight parts to 100 weight parts of the metal magnetic powder.

DETAILED DESCRIPTION OF THE INVENTION

In the following, a detailed description will be given for the present invention.

It is preferable that the metal magnetic powder used in the present invention comprises magnetic metal elements such as α—Fe, Fe—Co, Fe—Co—Ni, Co, Co—Ni, etc. as major component, and that the metal (such as Fe, Co, Ni, etc.) or an alloy is preferably contained in the magnetic powder by 70 weight % or more, or more preferably by 75 weight % or more because this contributes to improvement of the magnetic characteristics and, as a result, to improvement of electromagnetic characteristics.

In the metal magnetic powder, which contains Fe as a major component and further contains at least Co, the Co atoms are preferably contained by 0 to 40 mol % to Fe atoms, or more preferably by 6 to 35 mol %. In the magnetic alloy powder comprising Fe and/or Co as major components, it is preferable that it contains rare earth element including Y because this contributes to improvement of magnetic characteristics.

Further, the metal magnetic powder as described above may have oxide film on the surface of particles or may be metal magnetic powder having the surface partially carbonized or nitrided or having carbonaceous film on the surface or may contain small quantity of hydroxide or oxide.

As the metal magnetic powder as described above, metal powder produced by the manufacturing method already known in the art may be used, and the following methods may be used: a method to reduce an organic acid salt (mostly oxalate) of magnetic metal using a reducing gas such as hydrogen, a method to reduce a moisture-containing iron oxide or an iron oxide obtained by heating moisture-containing iron oxide using a reducing gas such as hydrogen, a method to produce a metal carbonyl compound by thermal decomposition, a method to reduce aqueous solution of magnetic alloy using a reducing agent such as sodium borohydride, hypophosphite or hydrazine, a method to obtain fine powder by evaporating metal in inert gas under reduced pressure, etc. The metal magnetic powder thus obtained may be used after processing by deoxidizing process already known such as a method to immerse the powder in an organic solvent and drying a method to immerse the powder in an organic solvent, to form an oxide film on the surface by supplying oxygen-containing gas and drying, or a method to form an oxide film on the surface by adjusting partial pressure on oxygen gas and inert gas without using an organic solvent.

To the metal magnetic powder as described above, a small quantity of the following elements may be added: Al, Si, Cr, Mn, Zn, Cu, Zr, Ti, Bi, Ag, Pt, B, C, P, N, Y, S, Sc, V, Mo, Rh, Pd, Ag, Sn, Sb, Te, Ba, Ta, W, Re, Au, Hg, Pb, La, Sr, or a rare earth element. Among these elements, it is preferable to add Al, Si, P, Y or a rare earth element to obtain the effect to improve particle size distribution and to prevent sintering.

Further, the metal magnetic powder as described above may contain water-soluble inorganic ions such as Na, K, Ca, Fe, Ni, etc., and the quantity of such inorganic ions is preferably not more than 500 ppm, or more preferably, not more than 300 ppm.

The metal magnetic powder as described above may be covered with Al, Si, P or an oxide film of these elements, or may be processed by surface treatment using a coupling agent of Si, Al, Ti, etc. or various types of surface active agents or may be processed in advance prior to dispersion using dispersing agent, lubricant, surface active agent, antistatic agent, etc.

Moisture content of the metal magnetic powder may be 0.1 to 2%, but it is preferable to optimize the moisture content depending upon the type of binder.

It is preferable to optimize the pH value of the metal magnetic powder depending upon the combination with the binder to be used. The pH value is preferably between 4 and 12, or more preferably between 6 and 10.

The specific surface area expressed by BET method, of the metal magnetic powder is 40 to 80 m$^2$/g, or more preferably 45 to 60 m$^2$/g. If it is less than 45 m$^2$/g, noise increases. If it is more than 80 m2/g, it is difficult to obtain satisfactory surface property, and this is not desirable. It is preferable that the coercive force be 1500 Oe or more and that magnetic saturation, σs is 120 emu/g or more.

The shape of the metal magnetic powder may be needle-like shape, spindle-like shape (i.e. needle-like shape with larger diameter at central portion), granular, spherical, etc. Any of these shapes may be selected according to the application of the magnetic recording medium. In a magnetic tape, for example, it is preferable to use the magnetic powder of needle-like or spindle-like shape rather than spherical or granular shape because higher effect can be expected in magnetic field orientation and the strength in the longitudinal direction of the magnetic layer itself increases. The ratio of longer axis to shorter axis of the magnetic powder of needle-like or spindle-like shape may be as desired while, the powder having the axial ratio of 3 to 10 normally gives better effect.

As the binder used in the present invention, a vinyl chloride copolymer and a polyurethane resin which comprises a group containing metal sulfamate, to be described later, are used.

The vinyl chloride copolymer used in the present invention preferably contains vinyl chloride by 60 to 95 weight %, or more preferably by 60 to 90 weight %. It is preferable that its average polymerization degree is in the order of 100 to 500.

As the vinyl chloride resin, the following products are used: vinyl chloride-vinyl acetate-vinyl alcohol copolymer, vinyl chloride-hydroxyalkyl-(metha)acrylate copolymer, vinyl chloride-vinyl acetate-maleic acid, vinyl chloride-vinyl acetate-hydroxyalkyl-(metha)acrylate, vinyl chloride-vinyl acetate-hydroxyalkyl-(metha) acrylate-maleic acid, vinyl chloride-vinyl acetate-vinyl alcohol-glycidyl-(metha) acrylate, vinyl chloride-hydroxyalkyl-(metha)acrylate-glycidyl-(metha)acrylate, vinyl chloride-vinyl acetate-vinyl alcohol-glycidyl-(metha)acrylate copolymer, vinyl chloride-hydroxyalkyl-(metha)acrylate-allylglycidyl ether, vinyl chloride-vinyl acetate-vinyl alcohol-allylglycidyl ether, etc. In particular, it is preferable to use a copolymer of vinyl chloride and a monomer having an epoxy (glycidyl) group.

As the vinyl chloride copolymer, it is preferable to use the copolymer containing a sulfate group and/or sulfo group as a polar group (hereinafter referred as "S-containing polar group"). In the S-containing polar group (—SO$_4$Y, —SO$_3$Y), Y may represent H or an alkali metal. In particular, it is preferable that Y=K, i.e. —SO$_4$K or —SO$_3$K.

One or both of these S-containing polar groups may be present. When both of these groups are present, they may be present in any ratio.

It is preferable that these S-containing polar groups may be present in 0.01 to 10 weight %, or more preferably by 0.1 to 5 weight %, in a molecule when converted to S atoms.

As the polar group, the following groups may be present when necessary in addition to the S-containing polar groups as described above: —SR (where R represents a hydrogen atom, an aliphatic hydrocarbon, or an aromatic hydrocarbon), —OPO$_2$Y group, —PO$_3$Y group, —COOY group (where Y represents a hydrogen atom, or an alkali metal), amino group (—NR$_2$), —NR$_3$Cl (where R represents a hydrogen atom, a methyl group or an ethyl group), etc.

Among these, —SR group may be used alone without simultaneously using the S-containing polar group, and it is the polar group preferably used when dispersing the metal magnetic powder with the S-containing polar group.

More specifically, vinyl chloride, vinyl acetate or other monomer which is copolymerizable with these substances when necessary, may be polymerized in the presence of a chain transfer agent containing SH such as mercaptan, although it is not limited to this. A compound obtained by substituting the hydrogen atom in aliphatic hydrocarbon by SH group in mercaptan and expressed by a general formula RSH, e.g. butylmercaptan, allylmercaptan, etc. may be used. Or, a compound obtained by substituting the side chain of benzene ring with SH, e.g. benzylmercaptan, may be used.

Also, amino group may be simultaneously used with the S-containing polar group as described above, and different types of amino groups may be used. In particular, it is preferable to use dialkylamono group (more preferably, alkyl having 1 to 10 carbon atoms).

Such an amino group is normally obtained by amino modification. Copolymer of vinyl chloride-alkyl-carboxylic acid vinyl ester is dispersed or dissolved in an organic solvent such as alcohol. Then, an amine compound (primary, secondary or tertiary amine such as aliphatic amine, cycloalphatic amine, alkanolamine, alkoxyalkylamine, etc.) and an epoxy group-containing compound to promote saponification reaction are added, and the above compound can be obtained. The vinyl unit having the amino group may be present in 0.05 to 5 weight %, and an ammonium salt group may be present.

The resin skeleton, with which these S-containing polar groups are bonded, is a vinyl chloride resin, and this can be obtained as follows: Vinyl chloride, vinyl monomer containing epoxy group, or other monomer copolymerizable with these substances are polymerized in the presence of a radical generating agent having a strong acid radical containing S such as potassium persulfate, ammonium persulfate, etc. The radical generating agent is used normally in 0.3 to 9.0 weight % to the monomer, or more preferably in 1.0 to 5.0 weight %. In the polymerization, it is preferable to use emulsion polymerization, or suspension polymerization using alcohol such as methanol as the polymerizing medium, or solution polymerization using ketones as a solvent because most of these substances are water-soluble.

In this case, in addition to the radical generating agent having strong acid radical containing S, a radical generating agent used in ordinary polymerization of vinyl chloride may be used.

Also, it is possible to combine the radical generating agent having S-containing strong acid radical with a reducing agent such as formaldehyde sodium sulfoxylate, sodium sulfite, sodium thiosulfate, etc.

Further, as the monomer having epoxy group, the following substances may be used: glycidyl ethers of unsaturated alcohol such as (metha)allylglycidyl ether, glycidyl esters of (metha)acrylic acid such as glycidyl-(metha)acrylate, glycidyl esters of unsaturated acid such as glycidyl-p-vinyl benzoate, methylglycidyl itaconate, glycidylethyl maleate, glycidylvinyl sulfonate, glycidyl-(metha)allyl sulfonate, etc., epoxide olefins such as butadiene monoxide, vinylcyclohexene monoxide, 2-methyl-5,6-epoxyhexene, etc. In general, these substances are used in such quantity that the epoxy group in the copolymer is present in 0.5 weight % or more.

As examples of monomers to be used when necessary in addition to the vinyl chloride and the monomer having epoxy group, the following substances may be used: vinyl esters of carboxylic acid such as vinyl acetate, viny propionate, etc., vinyl ethers such as methylvinyl ether, isobutylvinyl ether, cerylvinyl ether, etc., vinylidene such as vinylidene chloride, vinylidene fluoride, etc., unsaturated carboxylic acid ester such as diethyl maleate, butylbenzyl maleate, di-2-hydroxyethyl maleate, dimethyl itaconate, methyl (metha)acrylate, ethyl (metha)acrylate, lauryl (metha)acrylate, 2-hydroxypropyl (metha)acrylate, etc., olefins such as ethylene, propylene, etc., unsaturated nitrile such as (metha)acrylnitrile, etc.

The polyurethane resin to be simultaneously used with the vinyl chloride copolymer is polyurethane resin which has a group containing metal sulfamate. Specifically, the following substances are included:

The polyurethane resin having a group containing metal sulfamate is the one having a group containing metal sulfamate as a polar functional group to a resin, which is obtained by reaction of a hydroxy group-containing resin such as polyester polyol and/or polyether polyol with a polyisocyanate-containing compound. It is obtained by polymerization of the synthetic materials, to be described below, to have number average molecular weight of 5,000 to 200,000, and its Q value (weight average molecular weight/number average molecular weight) is about 1.5 to 4.

Further, it is preferable to use the vinyl chloride copolyer and the polyurethane resin which has a group containing metal sulfamate, at weight mixing ratio of 30 70 to 70:30. If the mixing ratio exceeds the above ratio, the effect of one of the components decreases, and the desirable properties will be lowered when it is used as the recording medium.

In the binder used, the polyurethane resin which has a group containing metal sulfamate is obtained by mixing at least two types or more of resins having glass transition temperature Tg in the range of $-20°$ C.$\leq$Tg$\leq 80°$ C. and having different Tg values, and it is contained in the total binder by 30 to 70 weight %. In so doing, it is possible to improve the balance of running stability, calender workability, and electromagnetic characteristics under high temperature conditions in addition to the effect of the present invention.

Various type of curing agents as described later may be added to the above binders, or various types of resins already known in the art may be present within the range of not more than 20 weight % of the total binder quantity.

As a compound containing hydroxy group to be used as a raw material for the polyurethane resin which has a group containing metal sulfamate as described above, the following substances may be used: polyalkylene glycol such as polyethylene glycol, polybutylene glycol, polypropylene glycol, etc., alkylene oxide addition products such as bisphenol A, polyester polyols having various types of glycols and hydroxyl group at the terminal of molecular chain, etc.

As the carboxylic acid component of polyester polyol to be used as raw materials, there are aromatic dicarboxylic acid such as terephthalic acid, isophthalic acid, orthophthalic acid, 1,5-naphthalic acid, etc., aromatic oxycarboxylic acid such as p-oxybenzoic acid, p-(hydroxyethoxy)-benzoic acid, etc. aliphatic dicarboxylic acid such as succinic acid, adipic acid, azelaic acid, cebacic acid, dodecanedicarboxylic acid, etc., unsaturated fatty acids and cycloaliphatic dicarboxylic acid such as fumaric acid, maleic acid, itaconic acid, tetrahydro-phthalic acid, hexahydrophthalic acid, etc. tri- and tetra-carboxylic acids such as trimellitic acid, trimesic acid, pyromellitic acid, etc. As alcohol components, the following compounds may be used: alkylene oxide addition products such as ethylene glycol, propylene glycol, 1.3-propane diol, 1,4-butane diol, 1,5-pentane diol, 1,6-hexane diol, neopentyl glycol, diethylene glycol, diethylene glycol, dipropylene glycol, 2,2,4-trimethyl-1,3-pentane diol, 1,4-cyclohexanedimethanol, bisphenol A, etc., alkylene oxide addition products such as hydrogenated bisphenol A, or compounds having 2 to 4 hydroxyl groups such as polyethylene glycol, polypropylene glycol, polytetra-methylene glycol, trimethylolethane, trimethylolpropane, glycerine, pentaerythritol, etc.

As the polyester polyol, lactone type polyester diols, obtained by ring opening polymerization of lactones such as caprolactone, may be used in addition to the above compounds.

As the polyisocyanate to be used, the following compounds may be used: diisocyanate compounds such as tolylene diisocyanate, phenylene diisocyanate, diphenyl-methane diisocyanate, hexamethylene diisocyanate, tetra-methylene diisocyanate, naphthalene diisocyanate, isophor-one diisocyanate, xylylene diisocyanate, diiso-cyanate methylcyclohexane, diisocyanate cyclohexyl-methane, dimethoxybiphenylene diisocyanate, diisocyanate diphenyl ether, etc., or triisocynate compounds such as trimer of tolylene diisocyatate having 7 mol % or less in total isocyanate group, trimer of hexamethylene diisocyanate.

Further, as the compound having a group which contains metal sulfamate, the following dicarboxylic acid component or diol components as described below may be used. Also, it is possible to use diamine to obtain polyurethane resin partially having urea bond, and such compounds are included in the polyurethane resin of the present invention because of the structure of the resin as a whole.

More specifically, the compounds having a group which contains metal sulfamate are as follows:

As the dicarboxylic acid components, there are the compounds expressed by the following general formulae:

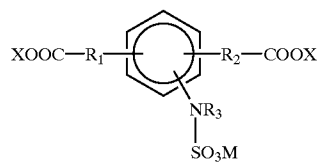

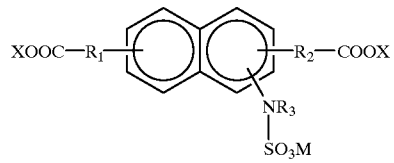

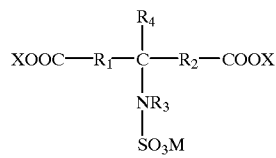

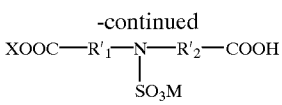

where $R_1$ and $R_2$ each represents a saturated hydrocarbon residual group of $CH_2$ to $C_6H_{12}$ or —COOX may be directly bound to an aromatic ring or a carbon atom without $R_1$ or $R_2$ (direct bonding with —COOX). $R_1$ and $R_2$ may be the same or different. $R_1'$ and $R_2'$ each represents saturated hydrocarbon residual group of $CH_2$ to $C_6H_{12}$, and $R_1'$ and $R_2'$ may be the same or different. $R_3$ represents a hydrogen atom, an alkali metal or an alkyl group, but it is preferably hydrogen, Na or K. M represents a hydrogen atom, an alkali metal or an ammonium group, but it is preferably hydrogen, Na or K. X represents hydrogen, $CH_3$ or $C_2H_5$. In terms of reaction, it is preferably $CH_3$. $R_4$ may be one of hydrogen, alkyl group, $CH_2OH$ or $C_2H_4OH$.

As concrete examples, the compounds expressed by the following formulae may be used:

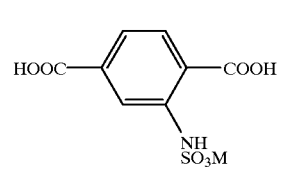
(formula 1)

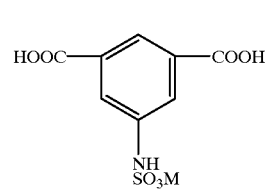
(formula 2)

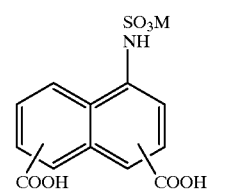
(formula 3)

As the diol components, the compounds expressed by the following general formulae may be used:

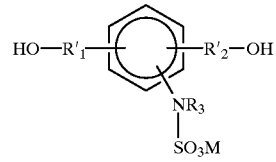

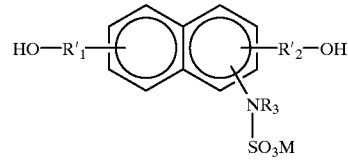

-continued

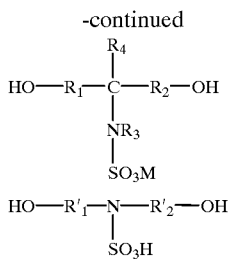

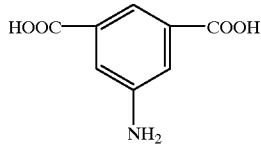

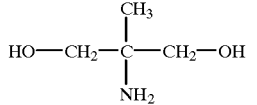

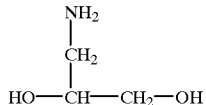

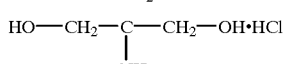

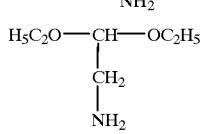

where $R_1$ and $R_2$ each represents a saturated hydrocarbon residual group of $CH_2$ to $C_6H_{12}$ or OH may be directly bound to a carbon atom without $R_1$ or $R_2$ (direct bonding with —OH). $R_1$ and $R_2$ may be the same or different. $R_1'$ and $R_2'$ each represents a saturated hydrocarbon residual group of $CH_2$ to $C_6H_{12}$, and $R_1'$ and $R_2'$ may be the same or different. $R_3$ represents hydrogen, alkali metal or alkyl group, but it is preferably hydrogen, Na or K. M represents hydrogen, alkali metal or ammonium group, but it is preferably hydrogen, Na or K. X represents hydrogen, $CH_3$ or $C_2H_5$, while it is preferably $CH_3$ in terms of reaction. $R_4$ represents hydrogen, alkyl group, $CH_2OH$ or $C_2H_4OH$.

As a concrete example, the compound expressed by the following formula may be used.

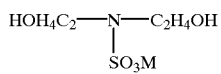

(formula 4)

As the amine component, a compound expressed by the following general formula is used:

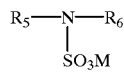

(where $R_5$ represents H or an alkyl group of $C_1$ to $C_4$. $R_6$ represents an alkyl group of $C_1$ to $C_4$. $R_5$ and $R_6$ may be the same or different.) As a concrete example, a compound expressed by the following formula may be used:

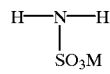

(formula 5)

Sulfamic acid can be synthesized as follows:
1. Amine is reacted with fuming sulfuric acid, chlorosulfuric acid, chlorsulfonic acid, etc.

$RNH_2 + ClSO_3H \longrightarrow RNHSO_3H + HCl$ $RNH_2 + SO_3 \longrightarrow RNHSO_3H$ 2. Amine is reacted with sulfuryl chloride:

$4R_2NH + Cl_2SO_2 \longrightarrow R_2NSO_2HR_2 + 2R_2NH_2Cl$ $R_2NH + SO_2Cl_2 \longrightarrow R_2NSO_2Cl \rightarrow R_2NSO_3H$ 3. Isocyanate is reacted with sulfuric acid:

$R—NCO + H_2SO_4 \longrightarrow R—NHSO_3H + CO_2$

4. Nitro compound is reduced using hydrogen sulfite.

$C_6H_5—NO_2 + NaHSO_3 \rightarrow C_6H_5—NH(SO_3Na) + NaHSO_4$

As examples of raw materials to synthesize sulfamic acid, the following compounds may be used, but the raw materials are not limited to these:

The component having a group which contains metal sulfamate is obtained by adding the above-described starting materials during synthesis of polyester by normal procedure or by reacting them in a solvent or without solvent using a given quantity as chain extender during synthesis of polyurethane.

The polar group having a group which contains metal sulfamate is preferably present in 0.5 to 3 per molecule in the polyurethane resin, or more preferably 1 to 2. If it is beyond the above range, coating dispersion property and coating stability are decreased, and this may lead to inconveniences such as deterioration of electromagnetic characteristics and durability.

The total quantity of the vinyl chloride copolymer and the polyurethane having a group which contains metal sulfamate is preferably 10 to 25 weight parts to 100 weight parts of the metal magnetic powder.

In the polyurethane resin as described above, as a polar group other than the group containing metal sulfamate, at least one or more polar groups selected from the following polar groups may be used: —$SO_3M$ and —$SO_4M$ as S-containing polar group; —$PO_3M$, —$PO_2M$, —POM, —P=O(OM$_1$)(OM$_2$), —OP=O(OM$_1$)(OM$_2$), —COOM, —NR$_4$X (where M, M$_1$ and M$_2$ represent Li, Na and K repsectively; R represents an alkyl group or H; H represents a halogen atom. In particular, Na is preferably used as M.), as P-cotnaing polar group; or polar groups such as —NR$_2$, —N$^+$R$_3$ (R represents a hydrocarbon group), —OH, epoxy group, —SH, —CN, etc. Among these groups, it is preferable to use Na as M.

It is preferable that the polar group is contained in the molecule as atoms by 0.01 to 10 weight %, or more preferably by 0.02 to 3 weight %. These polar groups may be present either in the main chain of the skeletal resin or in branches.

To perform cross-linking reaction of the vinyl chloride copolymer and the polyurethane, various types of polyisocyanates may be used as cross-linking agent (curing agent). It is preferable to use a cross-linking agent which is obtained by modifying one type or more of tolylene diisocyanate, hexamethylene diisocyanate, methylene diisocyanate, etc. to a compound having two or more hydroxyl group such as trimethylolpropane, or to use a isocyanuarate type cross-linking agent bonded with three molecules of diisocyanate compound. It is preferable that the cross-linking agent is present in 10 to 60 weight % to 100 weight % of the resin (10 to 50 weight % in the non-magnetic underlayer and the back-coat layer). By the cross-linking agent, 3-dimensional bonding with hydroxyl group in the binder resin can be achieved, and this contributes to improvement of the durability of the coating layer.

More concretely, the following compounds may be used: Coronate L, HL and 3041 (manufactured by Nippon Polyurethane Industry Co., Ltd.), 24A-100 and TPI-100 (manufactured by Asahi Chemical Industry Co., Ltd.), Desmodule L, N, etc. (manufactured by Bayer AG). These compounds are used by adding to the above resin by 1 to 60 weight % (10 to 50 weight % in the non-magnetic underlayer and the back-coat layer).

In general, to cure reactive or thermosetting resin as described above, it is heated at 50° C. to 80° C. for 6 to 100 hours in a heating oven or it may be passed at low speed through an oven kept at 80° C. to 120° C.

For the support member used in the present invention, polyesters such as polyethylene terephthalate (PET), polyethylene naphthalate (PEN), etc., polyolefins, or films already known in the art such as polyamide, polyimide, polyamideimide, polysulfone cellulose triacetate, polycarbonate, etc. may be used. Among these compounds, PET, PEN and aromatic polyamide are preferably used, or more preferably, composite film produced by multi-layer extrusion of two or three types of PET or PEN may be used. When these films are used, it is possible to obtain good balance of electromagnetic characteristics, durability, friction property, film strength and productivity.

It is preferable to add inorganic compounds such as oxide or carbonate of Al, Ca, Si, Ti, etc., or organic compounds such as acrylic resin fine powder as filler to the support member. By adjusting quantity and size of these compounds, it is possible to freely control surface property of the product. As a result, electromagnetic characteristics, durability, friction property, etc. can be controlled as desired.

Further, the support member may be processed in advance by corona discharge, plasma discharge and/or polymerization processing, adhesive agent coating, dust removing processing, and relaxation processing by adjusting heat and/or humidity.

The centerline surface roughness of the support member is preferably not more than 0.03 $\mu$m, or more preferably not more than 0.02 $\mu$m, or most preferably not more than 0.01 $\mu$m. It is preferable that the support member has not only lower centerline surface roughness but it has no coarse projection of 0.5 $\mu$m or more.

There is no restriction to the solvent to be used for adjustment of the magnetic coating materials in the present invention, but the solvent must be properly selected by taking solubility, compatibility, drying efficiency, etc. into account. For example, the following diluent or solvent may be used alone as a single solvent or as a mixed solvent by mixing at a given mixing ratio: ketones such as methylethyleketon, methylisobutylketone, cyclohexanone, etc., aromatic hydrocarbons such as toluene, xylylene, etc., esters such as ethyl acetate, butyl acetate, etc., alcohols such as isopropanol, butanol, etc., dioxane, tetrahydrofurane, dimethyl formamide, hexane, chlorine-substituted hydrocarbons, etc.

The organic solvents as described above may not necessarily have 100% purity, and impurities such as isomers, unreacted products, side reaction products, decomposed products, oxides, moisture, etc. may be present. These impurities are preferably present by not more than 5 weight %, or more preferably by not more than 3 weight %. If there are more impurities than the above value, the dispersion property of the magnetic powder, storage stability of the coating material, curing property of the magnetic layer, or preservation property of the medium may be adversely affected.

It is preferable that the solvents are preferably used in 10 to 10,000 weight %, or more preferably in 10 to 5,000 weight % to the total quantity of the binder so that the viscosity of the coating material is adjusted to 5 to 100 cp at shear rate of 3,000 sec$^{-1}$ when measured by cone plate type or double cylinder type viscosimeter in the coating stage. Regarding the ratio of the solvent to the total quantity of the coating material, the concentration of solids (non-volatile components) is preferably 5 to 40 weight %, or more preferably 10 to 35 weight %. To determine the type of solvent, mixing ratio and the quantity used, it is necessary to give consideration to the type, specific surface area, and particle size of the pigment used in the coating material, the magnetized quantity in case of the magnetic powder, pigment volume and weight filling degree, or dilution stability of the coating material, and these parameters should be adjusted to have the viscosity within the above range.

When adding the solvent, it is preferable that it is added stepwise in each process of the manufacture of the coating material. It is preferable to add gradually while limiting the flow rate and agitating in a tank or by mixing the coating material gradually in the piping. Further, it is preferable to perform filtration and/or dispersion processing if possible when the solvent is added. By taking such procedure, it is possible to improve the stability of the coating material and to exclude or suppress generation of aggregates and foreign objects.

As the lubricant to be used as additives in the present invention, it is preferable to use fatty acids and/or fatty acid esters among various types of lubricants already known in the art. These compounds may include: mono fatty acid ester, di-fatty acid ester, or tri-fatty acid ester, which comprises a monobasic fatty acid having 12 to 24 carbon atoms (may contain unsaturated bond or may be branched) or a monobasic fatty acid having 10 to 24 carbon a toms (may contain unsaturated bond or may be branched) and one of cyclic or polysaccharide reduced higher alcohols such as mono-hydric, di-hydric, tri-hydric, tetra-hydric, penta-hydric, hexa-hydric alcohol, sorbitan, or sorbitol. Two or more of these compounds may be used in combination.

As specific examples, the following compounds may be used; Lauric acid, myristic acid, palmitic acid, stearic acid, oleic acid, linoleic acid, linolenic acid, behenic acid, erucic acid, elaidic acid, etc. may be used as the monobasic fatty acids. Butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, butoxyethyl stearate etc. may be used as the fatty acid ester.

The effects of these fatty acids and/or fatty acid esters as lubricants or dispersing agents are obtained when the total percentage of these compounds in the magnetic powder is 0.1 weight % or more. If the percentage of these compounds is more than 20 weight % in the magnetic powder, these do not remain any more in the magnetic layer and are exposed on the surface of the coating film, thereby resulting in contamination of the magnetic head or in deterioration of the output.

For this reason, the total content of the fatty acids and/or fatty acid esters in the magnetic layer is preferably 0.1 to 20 weight % to the magnetic powder, or more preferably 1 to 15 weight %, or most preferably 1 to 12 weight %. If there is no magnetic powder, it may be used within the range of 0.01 to 100 weight % to the binder.

Also, it is preferable that lubricants are contained in the back-coat layer, the non-magnetic underlayer, etc. in addition to the magnetic layer. In particular, in case the magnetic layer is thin, it is effective to add the lubricant in the non-magnetic underlayer because it contributes to the improvement of still durability.

Further, if there is the back-coat layer, the lubricant may be added on the back-coat layer, and by transferring it to the surface of the magnetic layer, the surface lubricating property can be improved.

These fatty acids and/or fatty acid esters may not necessarily have 100% purity, and impurities such as isomers, unreacted products, side reaction products, decomposed products, oxides, etc. may be present in addition to major components. However, the percentage of these impurities in the total lubricants is preferably not more than 40 weight %, or more preferably not more than 20 weight %.

All or a part of the fatty acids, fatty acid esters, additives, etc. used in the present invention may be added in any of the processes in the manufacture of the coating materials for the magnetic recording medium of the present invention.

For example, these may be added by mixing with pigment powder prior to the kneading process, or these may be added in the kneading process of the pigment powder, the binder and the solvent, or these may be added in the dispersion process, or may be added after dispersion, or may be added immediately before coating, or may be diluted or dispersed in a solvent, and these may be coated on a layer where a solution prepared by diluting or dispersing these compounds in a solvent has been coated in advance.

In addition to the compounds described above, the additives having lubricating effect, antistatic effect, dispersion effect, plasticizing effect, etc. may be added in the present invention.

For example, the following compounds may be used: silicone oils, fluorine oils, alcohols containing fluorine-substituted hydrocarbon group, fatty acids, esters, ethers, paraffins, metal salt (Li, Na, K, Ca, Ba, Cu, Pb, etc.) of the above-mentioned monobasic fatty acids, alcohols for manufacturing the above-mentioned fatty acid esters, alkoxy alcohols, fatty acid esters of polyethylene oxide added monoalkyl ether, aliphatic or cyclic amines, fatty acid amides, quaternary ammonium salts, polyolefins, polyglycols, polyphenyl ether, fluorine-containing alkyl sulfuric acid ester and its alkali metal salt, nonionic surface active agents of alkylene oxide type, glycerine type, glycidol type, alkylphenolethylene oxide addition product, catinonic surface active agents such as phosphonium or sulfonium and its alkali metal salt, anionic surface active agents including acidic group such as carboxylic acid, sulfonic acid, phosphoric acid, sulfuric acid ester group, phosphoric acid ester group, etc. and its alkali metal salt, amino acids, amino sulfonic acids, sulfuric acid or phosphoric acid esters of amino-alcohol, ampholytic surface active agents such as alkyl betaine type.

These surface active agents are described in detail in "Handbook of Surface Active Agents" (published by Sangyo Tosho Co., Ltd.).

These additives may be added to the magnetic powder by not more than 10 weight % in total, or more preferably by 0.01 to 5 weight %. If there is no magnetic powder, these may be used in the range of 0.005 to 5.0 weight % to the binder.

As the inorganic powder used in the present invention, metals, metal oxides, metal carbonates, metal sulfates, metal nitrides, metal carbides, metal sulfides, etc. may be used.

More concretely, the following compounds may be used alone or in combination: α-alumina, β-alumina, γ-alumina, θ-alumina, δ-alumina, dichromium trioxide, α-iron oxide, γ-iron oxide, goethite, $SiO_2$, ZnO, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide, artificial diamond, etc.

These inorganic compounds may be used within the range of 0.1 to 30 weight % to the magnetic powder. When there is no magnetic powder, these may be used within the range of 50 to 2000 weight % to the binder.

These inorganic compounds may be used in combination depending upon the required properties of the back-coat layer, non-magnetic underlayer, etc.

The shape, size, etc. of the particles of the inorganic powder may be selected as desired. The shape of the particle is preferably spherical or polyhedron, and the particle size is preferably 0.01 to 0.7 μm. These may be properly selected in view of the balance of durability, head wearing, and output of the shortest recording wavelength of the recording medium. The particles may be single type or mixed type, and particle size distribution and other parameters may be selected separately.

The above inorganic compounds do not necessarily have 100% purity, and the effects are not decreased if main component is present by more than 70%.

It is necessary that these inorganic compounds have fewer water-soluble ions such as alkali metal, alkali earth metal, chlorine, sulfuric acid, nitric acid, etc. If more ions are contained, the storage property of the produced magnetic recording medium may be adversely affected.

Further, these inorganic compounds may be added at the same time as kneading with ferromagnetic powder, or these may be dispersed in a binder in advance and may be added at the dispersion of the magnetic coating material.

In the present invention, furnace carbon black, thermal carbon black, acetylene black, etc. may be used as carbon black.

Particle size, and other parameters of the carbon black may be properly selected depending upon the balance (depending on surface roughness) of electrical property, friction property and output at the shortest recording wavelength of the recording medium, or particle size distribution may be selected separately.

The average particle size of the carbon black is 10 to 400 nm, or more preferably 10 to 350 nm. In particular, when electromagnetic characteristics are considered with priority, it is preferably 10 to 40 nm. In case importance is placed on friction property, as large particle size as allowable for the electromagnetic characteristics may be used within the range of 40 to 350 nm.

The BET specific surface area of the carbon black is preferably 100 to 500 $m^2/g$, or more preferably 150 to 400 $m^2/g$. DBP oil absorption is preferably 20 to 400 ml/100 g, or more preferably 30 to 200 ml/100 g. Because particle size, BET value and DBP oil absorption value are closely related with each other, it is practically impossible to use them as independent values. It is necessary to select these three values experimentally depending upon the property of the medium, and the dispersion property and fluid property of the coating material.

The carbon black is used in the ratio of 10 to 500 weight % to the binder or within the range of 0.1 to 20 weight % to the magnetic powder. It is necessary to select the ratio experimentally depending upon the properties required for the medium, and the dispersion property and fluid property of the coating material.

The carbon black may be properly combined to suit the properties required for the magnetic layer, back-coat layer, non-magnetic underlayer, etc.

Further, the carbon black may be added at the same time as the kneading with the magnetic powder, and may be dispersed in a binder in advance and may be added at the dispersion of the magnetic coating material.

The carbon black may be processed by surface treatment using lubricant, dispersion agent, etc. or a part of the surface may be turned to graphite and used.

The carbon blacks to be used in the present invention are described in detail, for example, in "Handbook of Carbon Blacks" (compiled by Japanese Association of Carbon Blacks), and reference should be made to this and other literature.

As non-magnetic organic powder to be used in the present invention, the following compounds may be used: acrylstyrene resin powder, benzoguanamine resin powder, melamine resin powder, phthalocyanine pigment, polyolefin resin powder, polyester resin powder, polyamide resin powder, polyimide resin powder, fluorinated hydrocarbon resin powder, divinylbenzene resin powder, etc.

These organic compounds may be used within the range of 0.1 to 20 weight % to the binder.

These organic compounds may be properly selected and combined depending upon the required properties of the magnetic layer, the back-coat layer and the non-magnetic underlayer.

The magnetic layer in the present invention may be provided on one side or on both sides of the support member, or two or more magnetic layers may be provided. In case the magnetic layer is provided only on one side of the support member, it is preferable to arrange the back-coat layer on the opposite side.

In addition to the use of the binder already known in the back-coat layer of the present invention, the same binder as used in the magnetic layer of the present invention may be used. Specifically a binder comprising a vinyl chloride copolymer and a urethane resin which has a group containing metal sulfamate as functional group, may be used. Instead of the vinyl chloride copolymer, for example, nitrocellulose resin, butyral resin, acrylic resin, etc. may be used. This makes it possible to extensively improve stability of the coating film of the back-coat layer and to obtain a product with high electromagnetic characteristics.

In case the above binder of the present invention is used, carbon black having average particle size of 10 to 100 nm, and BET value of 20 to 600 ($m^2$/g) may be used.

A non-magnetic underlayer made of non-magnetic material may be provided under the magnetic layer with the purpose of improving surface property, adhesive property and durability, or a protective lubricating layer containing lubricant, plasma polymerized film, diamond-like film, etc. may be arranged on the magnetic layer to ensure lubrication and protection of the magnetic layer.

In addition to the use of the binder already known in the art as the non-magnetic underlayer in the present invention, the same binder as used in the magnetic layer of the present invention i.e. a binder comprising a vinyl chloride copolymer and a polyurethane resin having a group which contains metal sulfamate as functional group, may be used. This makes it possible to produce a magnetic recording medium having high electromagnetic characteristics.

In case the binder as described above is used in the present invention, powder (length of longer axis 0.05 to 0.250 μm; axial ratio 1 to 10; BET 30 to 80 $m^2$/g, or more preferably 30 to 60 $m^2$/g; pH 5 to 9), and/or the same carbon black as described above may be used as the non-magnetic powder.

The processes to manufacture the magnetic coating material of the magnetic recording medium of the present invention comprise at least a kneading process, and dispersion process, as well as mixing process before or after these processes when necessary.

Each of the processes may be divided into two stages or more, and raw materials may be added separately in two or more processes.

It is needless to say that conventional manufacturing technique may be used in a part or all of these processes. In the kneading process, the apparatuses having high kneading power such as continuous kneader, pressurized kneader, high speed mixer, two-roll mill, etc. may be used. When these kneaders are used, metal magnetic powder and all or a part of the binder may be kneaded (preferably by 30 weight % or more of the total binder), and it is kneaded within the range of 15 to 500 weight % to 100 weight % of the metal magnetic powder.

In the dispersion of the coating material to be used in each of the processes, it is desirable to use a dispersion media with high specific gravity, and ceramic media such as zirconia are the most suitable for the purpose, while glass beads, metal beads, alumina beads, etc. as used in the past may be properly selected and used depending upon the composition of the product.

On a long, film-like non-magnetic support member pulled out of feed roll, the coating material is applied by various coating means already known in the art such as gravure coating, reverse roll coating, extrusion nozzle coating, etc.

In general, prior to the coating of the coating materials, the non-magnetic support member is processed for cleaning and surface preparation by various means such as wet cleaning using water, solvent, etc., dry cleaning using nonwoven fabric or very fine textile fabric as wiper, non-contact cleaning using compressed air, vacuum, ionized air, etc. To improve adhesion of the coating material with the non-magnetic support member or to improve quality of coating surface, various types of non-contact surface treatment methods may be applied such as corona discharge, ultraviolet ray irradiation, electronic beam irradiation, etc.

Further, undercoating or prime coating may be preformed using aqueous primer, emulsion type primer, solvent type primer, etc. This may be performed alone or in combination with the surface treatment as described above for the purpose of improving adhesion. Technically, a coating material may be prepared by dispersing non-magnetic inorganic pigment or organic pigment in a binder, and this may be coated as prime coating layer instead of prime coating with resin only, or this may be performed simultaneously with the surface treatment as described above.

In general, a single magnetic layer is formed by coating, although it is possible to arrange two or more layers to provide higher functions. In this case, the magnetic layer or the non-magnetic layer may be coated by wet-on-dry method or wet-on-wet method as already known in the art.

After the coating process as described above, various types of processing may be performed for smoothing of the wet film surface of the magnetic coating material provided on the non-magnetic support member or for complying with the restriction of coating film. As smoothing means, film, bar, etc. made of resin, metal, ceramics, etc. may be brought into contact with film surface, or magnetic field caused by permanent magnet or electromagnet, or vibration provided by ultrasonic wave may be used as non-contact method already known. These methods may be applied alone or in combination depending upon the required property of the magnetic recording medium.

When the magnetic layer is arranged, it is necessary to apply a magnetic field and to orient magnetic particles in the layer. The direction of the orientation may be in the longitudinal direction of the recording medium or may be perpendicular or diagonal to the direction of the recording medium. To arrange the orientation toward a given direction, it is preferable to use a permanent magnet such as ferrite magnet, rare earth magnet, etc., or an electromagnet, a solenoid, etc. alone or in combination and to apply magnetic field of 1000 G or more. Further, in order to have higher orientation property after drying, the magnetic layer may be dried properly in advance prior to orientation or may be dried at the same time with the orientation process. In case of floppy disk, the magnetic powder spontaneously oriented in the coating may be turned to non-oriented state using a permanent magnet, an electromagnet, a solenoid, etc.

After coating has been completed, the magnetic coating film is dried and fixed by drying and evaporating means already known such as hot air, far infrared radiation, electric heater, vacuum equipment, etc. installed in a drying furnace, or by a curing means already known such as ultraviolet ray lamp, radiation irradiating system, etc.

The drying temperature is in the range from room temperature to about 300° C. and may be determined in view of heat-resistant property of the non-magnetic support member or type of solvent, concentration, etc. A temperature gradient may be provided in the drying furnace. As the atmosphere gas in the drying furnace, air or inert gas may be used.

When drying is performed using ultraviolet ray lamp or radiation irradiating system, a curing reaction may occur. In view of the subsequent processing, it is preferable to use other drying means whenever possible.

The irradiation by ultraviolet ray or radiation may result in ignition or fuming when a solvent is present. In this case, again, it is preferable to use other drying means whenever possible.

After the magnetic layer has been dried as described above, calender processing is carried out to smooth the surface when necessary. As calender rolls, plastic rolls made of heat-resistant plastics such as epoxy, polyester, nylon, polymide, polyamide, polyimideamide, etc. (may be kneaded with carbon, metal or other inorganic compounds) may be combined with metal roll (combination in 3–7 stages) and used, or a combination of metal rolls alone may be used. The temperature of calender processing is preferably 70° C. or more, or more preferably 80° C. or more. Linear pressure is preferably 200 kg/cm or more, or more preferably 300 kg/cm or more, and processing speed is 20 to 700 m/min.

After calender processing, heat curing processing and/or electron beam irradiation processing may be performed at 40° C. to 80° C. to promote curing of the magnetic layer, the back-coat layer and the non-magnetic layer.

Next, the product is fabricated to have a predetermined shape, and secondary processing is performed to prepare a magnetic recording medium.

DETAILED DESCRIPTION OF THE PREFERRED EMBODIMENTS

In the following, a detailed description will be given for embodiments of the present invention.
Evaluation method
[Glossiness]

Glossiness was determined in accordance with JIS Z 8741.
Measuring instrument: Gloss meter (GM-3D; Murakami Color Research Laboratory)
Incident angle—reflection angle:
60°–60°
[Viscosity]

By cone plate type viscosimeter, apparent viscosity (cps) at shear rate of 3000 sec$^{-1}$ and yield value (dyn/cm$^2$) were determined, and the ratio (viscosity/yield value) was obtained.
Instrument used: Soliquid Meter WR300 (Rheology Co., Ltd.)
[Rectangular ratio]

This was expressed as the ratio of residual magnetic flux density Br determined in external magnetic field of 10 KOe to maximum magnetic flux density Bm.
Measuring instrument: VSM-III (Toei Industry Co.)
[Coating material (paint) stability]

After the coating material used for evaluation of glossiness was left to stand for 5 days, it was coated on a polyester film and was dried, and glossiness of the coated film was determined. In the table, values are shown as decrement from the initial glossiness.
[Surface roughness Ra]

Surface roughness Ra was determined in accordance with JIS B 0601.
Measuring instrument: Talystep System (Taylor Hobson Co.)

Measuring conditions
Filter condition: 0.18–9 Hz
Feeler: 0.1×2.5 µm special stylus
Feeler pressure: 2 mg
Measuring speed: 0.03 mm/sec
Measuring length: 500 µm
[Electromagnetic characteristics]

Using AJ-D350 (Panasonic), RF out put (λ=0.7 mm) was measured at optimal recording current. In the table, the values are shown with RF output of comparative Example 5 as 0 dB.
[Durability]

Using AJ-D350 (Panasonic), a shuttle test for 40 hours was performed under the condition of 25° C. and 60% relative humidity. After the running, the head contamination was observed with a microscope. The mark O indicates that there was no head contamination. The mark Δ indicates that head contamination was observed, but there was no substantial problem. The mark × indicates that there was problem due to head contamination.

EXAMPLE 1

Magnetic coating composition for forming the magnetic layer

Metal magnetic powder 100 weight parts

Using the following composition, including metal magnetic powder (Fe/Co/Al/Y=100/20/4.7/1.8 (weight ratio) [Hc=1850 Oe; σs=140 emu/g; BET specific surface area 55 m$^2$/g; average longer axis length 0.11 µm; average axial ratio 6], a magnetic coating material to form the magnetic layer was prepared:

Vinyl chloride copolymer (MR110; Nippon Zeon Co., Ltd.)

(Vinyl chloride=84.7 wt %; hydroxyl group=0.47 wt %; epoxy group=3.0 wt %; SO$_4$K=1.5/molecule; polymerization degree=300)
7 weight parts Polyester polyurethane resin (specimen No. SRA15)
(Group containing metal sulfamate=1.5/polymer; Tg=70° C.; number average molecular weight=10,000/weight average molecular weight=30,000)
7 weight parts α-alumina (HIT 60A; Sumitomo Chemical Industry Co., Ltd.)

| Magnetic coating composition for forming the magnetic layer | |
|---|---|
| Metal magnetic powder  Using the following composition, including metal magnetic powder (Fe/Co/Al/Y = 100/20/4.7/1.8 (weight ratio) [Hc = 1850 Oe; σs = 140 emu/g; BET specific surface area 55 m$^2$/g; average longer axis length 0.11 µm; average axial ratio 6], a magnetic coating material to form the magnetic layer was prepared: | 100 weight parts |
| Vinyl chloride copolymer (MR110; Nippon Zeon Co., Ltd.)  (Vinyl chloride = 84.7 wt %; hydroxyl group = 0.47 wt %; epoxy group = 3.0 wt %; SO$_4$K = 1.5/molecule; polymerization degree = 300) | 7 weight parts |
| Polyester polyurethane resin (specimen No. SRA15)  (Group containing metal sulfamate = 1.5/polymer; Tg = 70° C.; number average molecular weight = 10,000/weight average molecular weight = 30,000) | 7 weight parts |
| α-alumina (HIT 60A; Sumitomo Chemical Industry Co., Ltd.)  (average particle size = 0.2 µm) | 10 weight parts |

-continued

| Magnetic coating composition for forming the magnetic layer | |
|---|---|
| Stearic acid | 1 weight part |
| Butyl stearate | 1 weight part |
| Methylethylketone | 120 weight parts |
| Toluene | 120 weight parts |
| Cyclohexane | 54 weight parts |

A part or all of these compositions were kneaded completely using a kneader, and were dispersed, mixed and diluted in a sand grinder mill. To the magnetic coating material thus obtained, a curing agent (Coronate L; Nippon Polyurethane Industry Co., Ltd.; NCO content 13.2 wt %) was added by 4.2 weight parts and was mixed. The coating material obtained was filtered through a filter of 0.6 µm. Using a nozzle coating method, this was coated on a PET film support member of 10.0 µm in thickness to have a magnetic layer with a dried thickness of 3.0 µm. Then, orientation processing, drying, calender processing, and curing processing (60° C.; 24 hours) were performed.

A coating material for forming the back-coat layer was prepared by adding and mixing a curing agent (Coronate L; Nippon Polyurethane Industry Co., Ltd.) by 20 weight parts to a back-coat composition with the components described below, and this was coated on the opposite side of the PET film support member (the side where the magnetic layer is not provided). After calender processing, heat curing was performed. Then, this was cut to a width of ½ inch, and a sample of tape-like magnetic recording medium was prepared (Sample 1).

Composition for preparing the back-coat layer

Carbon black-1 (Conductex SC Ultra; Columbian Carbon Co., Ltd.)
  (Average particle size 20 nm; BET value 220 m$^2$/g)
  80 weight parts
Carbon black-2 (Sabacurve MT; Columbian Carbon Co., Ltd.)
  (Average particle size 350 nm; BET value 8 m$^2$/g)
  1 weight part
α-iron oxide (TF-100; Today Industry Co., Ltd.)
  (Average particle size 0.1 µm)
  1 weight part
Vinyl chloride copolymer A (MPR-TA; Nisshin Chemical Industry Co., Ltd.)
  (vinyl chloride-vinyl acetate-vinyl alcohol copolymer)
  (Average polymerization degree 420)
  40 weight parts
Vinyl chloride copolymer B (MPR-ANO (L); Nisshin Chemical Industry Co., Ltd.)
  (vinyl chloride-vinyl acetate-vinyl alcohol copolymer)
  (Nitrogen atoms 390 ppm; average polymerization degree 340)
  25 weight parts
Polyester polyurethane resin
  (TS9555; Toyobo Co., Ltd.)
  (containing —SO$_3$Na; number average molecular weight 40,000)

| Composition for preparing the back-coat layer | |
|---|---|
| Carbon black-1 (Conductex SC Ultra; Columbian Carbon Co., Ltd.) (Average particle size 20 nm; BET value 220 m$^2$/g) | 80 weight parts |
| Carbon black-2 (Sabacurve MT; Columbian Carbon Co., Ltd.) (Average particle size 350 nm; BET value 8 m$^2$/g) | 1 weight part |
| α-iron oxide (TF-100; Today Industry Co., Ltd.) (Average particle size 0.1 µm) | 1 weight part |
| Vinyl chloride copolymer A (MPR-TA; Nisshin Chemical Industry Co., Ltd.) (vinyl chloride - vinyl acetate - vinyl alcohol copolymer) (Average polymerization degree 420) | 40 weight parts |
| Vinyl chloride copolymer B (MPR-ANO (L); Nisshin Chemical Industry Co., Ltd.) (vinyl chloride - vinyl acetate - vinyl alcohol copolymer) (Nitrogen atoms 390 ppm; average polymerization degree 340) | 25 weight parts |
| Polyester polyurethane resin (TS9555; Toyobo Co., Ltd.) (containing —SO$_3$Na; number average molecular weight 40,000) | 35 weight parts |
| Methylethylketone | 700 weight parts |
| Toluene | 400 weight parts |
| Cyclohexane | 300 weight parts |

EXAMPLES 2 TO 5; COMPARATIVE EXAMPLE 1

A tape-like magnetic recording medium was prepared by the same procedure as in Example 1 except that the quantity of the group containing metal sulfamate was changed as shown in Table 1.

EXAMPLES 6 AND 7; COMPARATIVE EXAMPLES 2 AND 3

A tape-like magnetic recording medium was prepared by the same procedure as in Example 1, except that blending ratio of vinyl chloride resin and polyurethane resin was changed as shown in Table 1.

EXAMPLES 8 TO 12; COMPARATIVE EXAMPLE 4

A tape-like magnetic recording medium was prepared by the same procedure as in Example 1, except that the blending ratio of curing agent was changed as shown in Table 1.

EXAMPLE 13

A tape-like magnetic recording medium was prepared by the same procedure as in Example 1, except that the type of curing agent in the magnetic layer was changed as shown in Table 1 (Coronate 2030; Nippon Polyurethane Industry Co., Ltd.; NCO content 8.0 wt %).

EXAMPLES 14 TO 20

A tape-like magnetic recording medium was prepared by the same procedure as in Example 1, except that the magnetic powder in the magnetic layer was changed as shown in Table 1.

COMPARATIVE EXAMPLE 5

A tape-like magnetic recording medium was prepared by the same procedure as in Example 1, except that the polar group of polyurethane resin was replaced by a group containing sodium sulfonate (UR8200; Toyobo Co., Ltd.; Tg=73° C.; Mn=25,000).

COMPARATIVE EXAMPLE 6

A tape-like magnetic recording medium was prepared by the same procedure as in Comparative Example 5, except that the metal magnetic powder was changed as shown in Table 1.

COMPARATIVE EXAMPLE 7

A tape-like magnetic recording medium was prepared by the same procedure as in Example 1, except that the polar group of polyurethane resin was replaced by a group having COOH (specimen No. CRA15; Tg=59° C; Mn=74,300).

COMPARATIVE EXAMPLE 8

A tape-like magnetic recording medium was prepared by the same procedure as in Example 1, except that the polar group of polyurethane resin was replaced by a group having $PO(OH)_2$ (ESTANE 5799; B.F. Goodrich Inc.; Tg=67° C.; Mw 45,000).

EXAMPLE 21

A tape-like magnetic recording medium was prepared by the same procedure as in Example 1, except that the polar group of vinyl chloride resin was replaced by a group having SH by 1.5 per molecule (specimen number VS15; polymerization degree 280; Tg=65° C.; containing vinyl acetate and acryl OH).

EXAMPLE 22

<Non-magnetic underlayer>

α—$Fe_2O_3$ 100 weight parts
 (BET=49 $g/m^2$; average longer axis length=0.15 μm; axial ratio=7)
Vinyl chloride copolymer
 (MR110; Nippon Zeon Co., Ltd.)
 (Vinyl chloride=84.7 wt %; hydroxyl group=0.47 wt %; epoxy group=3.0 wt %; $SO_4K$=1.5/molecule; polymerization degree=300)
 10 weight parts
Polyester polyurethane resin
 (Group containing metal sulfamate of Table 2: 1.5/polymer)

| <Non-magnetic underlayer> | |
|---|---|
| α-$Fe_2O_3$ (BET = 49 $g/m^2$; average longer axis length = 0.15 μm; axial ratio = 7) | 100 weight parts |
| Vinyl chloride copolymer (MR110; Nippon Zeon Co., Ltd.) (Vinyl chloride = 84.7 wt %; hydroxyl group = 0.47 wt %; epoxy group = 3.0 wt %; $SO_4K$ = 1.5/molecule; polymerization degree = 300) | 10 weight parts |
| Polyester polyurethane resin (Group containing metal sulfamate of Table 2: 1.5/polymer) | 10 weight parts |
| Stearic acid | 1 weight part |
| Butyl stearate | 1 weight part |
| Methylethylketone | 80 weight parts |
| Toluene | 80 weight parts |
| Cyclohexane | 80 weight parts |

These components were kneaded and mixed well using a kneader and were dispersed using a sand grinder mill. To this, Coronate L was added by 4 weight parts, and a coating solution for non-magnetic underlayer was prepared. This coating material was filtered through a filter of 0.6 μm, and was coated on a polyethylene terephthalate (PET) support member and was dried. After calender processing, curing was performed at 60° C. for 24 hours. Using the same magnetic coating material as in Comparative Example 5, a magnetic layer was coated. After coating the magnetic layer, magnetic field orientation was performed, and drying and calender processing were carried out. The dried thickness of the magnetic layer was set to 0.5 μm, and the dried thickness of the non-magnetic underlayer was set to 2.0 μm.

Next, a coating material for back-coat layer as used in Example 1 was coated on the opposite side of the PET film support member, and a back-coat layer was formed. Then, calender processing and heat curing were carried out, and by cutting it to a width of ½ inch, a sample of tape-like magnetic recording medium was prepared. The characteristics of this medium are shown in Table 2.

EXAMPLES 23 TO 26; COMPARATIVE EXAMPLE 9

A tape-like magnetic recording medium was prepared by the same procedure as in Example 22, except that the content of the group containing metal sulfamate in the non-magnetic underlayer was changed as shown in Table 2.

EXAMPLES 27 AND 28; COMPARATIVE EXAMPLES 10 AND 11

A tape-like magnetic recording medium was prepared by the same procedure as in Example 22, except that the blending ratio of vinyl chloride and polyurethane resin in the non-magnetic underlayer was changed as shown in Table 2.

EXAMPLES 29 TO 32; COMPARATIVE EXAMPLE 12

A tape-like magnetic recording medium was prepared by the same procedure as in Example 22, except that the blending ratio of the curing agent in the non-magnetic underlayer was changed as shown in Table 2.

EXAMPLES 33 AND 34

A tape-like magnetic recording medium was prepared by the same procedure as in Example 22, except that the non-magnetic powder was changed as shown in Table 2.

COMPARATIVE EXAMPLE 13

A tape-like magnetic recording medium was prepared by the same procedure as in Example 22, except that the polar group of polyurethane resin in the non-magnetic underlayer was replaced by a group having sodium sulfonate (UR8200; Toyobo Co., Ltd.).

EXAMPLE 35

A tape-like magnetic recording medium was prepared by the same procedure as in Example 22, except that the carbon black (particle size 30 nm; BET 70 $m^2/g$) as additive was blended and dispersed to have a-iron oxide at weight ratio of 60 : 40 as shown in Table 2.

EXAMPLE 36

A tape-like magnetic recording medium was prepared by the same procedure as in Example 35, except that the non-magnetic powder was replaced by needle-like titanium oxide (particle longer axis 100 nm; axial ratio 5; BET 55 $m^2/g$) as shown in Table 2.

EXAMPLES 37 TO 41; COMPARATIVE EXAMPLE 14

A magnetic layer was prepared by the same process as in Example 1 and using the same magnetic coating material as in Comparative Example 5. Then, a back-coat layer was provided on the opposite side of the support member. A tape-like magnetic recording medium was prepared by changing the composition of the binder of the back-coat layer from that of Example 1 to the composition shown in Table 3.

EXAMPLES 42 AND 43; COMPARATIVE EXAMPLES 15 AND 16

A tape-like magnetic recording medium was prepared by the same procedure as in Example 39, except that the blending ratio of vinyl chloride and polyurethane resin in the back-coat layer was changed as shown in Table 3.

EXAMPLES 44 TO 47; COMPARATIVE EXAMPLE 17

A tape-like magnetic recording medium was prepared by the same procedure as in Example 39, except that the blending ratio of the curing agent in the back-coat layer was changed as shown in Table 3.

EXAMPLES 48 TO 50

A tape-like magnetic recording medium was prepared by the same procedure as in Example 39, except that vinyl chloride resin in the back-coat layer was replaced by the other resin as shown in Table 3.

EXAMPLES 51 AND 52

A tape-like magnetic recording medium was prepared by the same procedure as in Example 39, except that carbon particles were changed as shown in Table 3.

COMPARATIVE EXAMPLE 18

A tape-like magnetic recording medium was prepared by the same procedure as in Example 39, except that the polar group in the polyurethane resin in the back-coat layer was replaced by number a group having sodium sulfamate by /molecule as shown in Table 3 (UR8200; Toyobo Co. Ltd.).

EXAMPLE 53

A tape-like magnetic recording medium was prepared by the same procedure as in Example 39, except that the carbon particles were changed as shown in Table 3 and the carbon particles were limited to one type.

EXAMPLE 54

A tape-like magnetic recording medium was prepared by the same procedure as in Example 39, except that the carbon particles were changed as shown in Table 3 and the carbon particles were limited to two types.

EXAMPLE 55

After a magnetic layer was prepared by the same procedure as shown in Example 1, the same back-coat layer as in Example 39 was prepared, and a tape-like magnetic recording medium was prepared.

EXAMPLE 56

After a non-magnetic underlayer was prepared by the same procedure as in Example 22, the same magnetic layer and the same back-coat layer as in Example 1 were prepared, and a tape-like magnetic recording medium was prepared.

EXAMPLE 57

A non-magnetic underlayer was prepared by the same procedure as in Example 22, and the same back-coat layer as in Example 1 was prepared with the same composition as in Example 1, except that only the thickness was changed, and a tape-like magnetic recording medium was prepared.

EXAMPLE 58

The same non-magnetic underlayer and the same magnetic layer were prepared by the same procedure as in Example 22, and the same back-coat layer as in Example 39 was prepared, and a tape-like magnetic recording medium was prepared.

EXAMPLE 59

A non-magnetic layer and a magnetic layer were prepared by the same procedure as in Example 56. The same back-coat layer as in Example 39 was prepared, and a tape-like magnetic recording medium was obtained.

TABLE 1

| | magnetic powder | | | Sulfamate in | | | | Coating material properties | | | | Surface roughness | Electromagnetic char. | | Durability |
|---|---|---|---|---|---|---|---|---|---|---|---|---|---|---|---|
| | | | | | | | | | | Stability | | | | | |
| | longer axis (μm) | σs (emu/g) | BET (m²/g) | Urethane resin per poly (A) | Other binder (B) | Resin ratio A/B | Curing agent (phr) | Glossiness (%) | vis/y.va × 10⁻² | Glossiness after 5 days | Rectangular ratio | Ra (nm) | output (dB) | C/N (dB) | Head contamination |
| E 1 | 0.11 | 140 | 55 | 1.5 | Vin. Cl. | 50/50 | 30 | 168 | 13.0 | 0 | 0.85 | 5.0 | +1.4 | +1.4 | ○ |
| E 2 | 0.11 | 140 | 55 | 0.5 | Vin. Cl. | 50/50 | 30 | 160 | 11.8 | −2 | 0.84 | 5.2 | +0.8 | +1.2 | ○ |
| E 3 | 0.11 | 140 | 55 | 1 | Vin. Cl. | 50/50 | 30 | 164 | 12.2 | −1 | 0.85 | 5.1 | +1.0 | +1.1 | ○ |
| E 4 | 0.11 | 140 | 55 | 2 | Vin. Cl. | 50/50 | 30 | 171 | 12.9 | 0 | 0.85 | 5.0 | +1.2 | +1.1 | Δ |
| E 5 | 0.11 | 140 | 55 | 1 | Vin. Cl. | 50/50 | 30 | 167 | 12.0 | −1 | 0.84 | 5.1 | +0.9 | +1.2 | ○ |
| C 1 | 0.11 | 140 | 55 | 4 | Vin. Cl. | 50/50 | 30 | 135 | 9.0 | −8 | 0.82 | 5.8 | −0.2 | −0.5 | ○ |
| C 2 | 0.11 | 140 | 55 | 1.5 | Vin. Cl. | 80/20 | 30 | 155 | 9.3 | −3 | 0.80 | 6.2 | −0.1 | −0.6 | Δ |
| E 6 | 0.11 | 140 | 55 | 1.5 | Vin. Cl. | 70/30 | 30 | 160 | 12.1 | −2 | 0.85 | 4.8 | +1.1 | +1.8 | ○ |
| E 7 | 0.11 | 140 | 55 | 1.5 | Vin. Cl. | 30/70 | 30 | 162 | 12.0 | −2 | 0.85 | 5.6 | +0.8 | +1.0 | ○ |
| C 3 | 0.11 | 140 | 55 | 1.5 | Vin. Cl. | 20/80 | 30 | 150 | 9.3 | −7 | 0.80 | 6.4 | −0.4 | −0.7 | Δ |
| E 8 | 0.11 | 140 | 55 | 1.5 | Vin. Cl. | 50/50 | 10 | 169 | 13.3 | 0 | 0.85 | 4.6 | +1.3 | +1.5 | ○ |
| E 9 | 0.11 | 140 | 55 | 1.5 | Vin. Cl. | 50/50 | 20 | 168 | 13.0 | 0 | 0.85 | 4.8 | +1.3 | +1.5 | ○ |
| E 10 | 0.11 | 140 | 55 | 1.5 | Vin. Cl. | 50/50 | 40 | 166 | 12.6 | 0 | 0.85 | 5.2 | +1.0 | +1.2 | ○ |
| E 11 | 0.11 | 140 | 55 | 1.5 | Vin. Cl. | 50/50 | 50 | 163 | 12.3 | −2 | 0.84 | 5.5 | +0.8 | +0.7 | ○ |
| E 12 | 0.11 | 140 | 55 | 1.5 | Vin. Cl. | 50/50 | 60 | 159 | 11.5 | −5 | 0.83 | 5.7 | +0.8 | +0.3 | ○ |
| C 4 | 0.11 | 140 | 55 | 1.5 | Vin. Cl. | 50/50 | 70 | 150 | 8.5 | −13 | 0.79 | 6.1 | −0.2 | −0.7 | ○ |
| E 13 | 0.11 | 140 | 55 | 1.5 | Vin. Cl. | 50/50 | 30* | 168 | 13.0 | 0 | 0.85 | 5.0 | +1.3 | +1.3 | ○ |
| E 14 | 0.08 | 140 | 58 | 1.5 | Vin. Cl. | 50/50 | 30 | 178 | 12.0 | −1 | 0.84 | 4.6 | +1.8 | +2.3 | ○ |
| E 15 | 0.11 | 130 | 57 | 1.5 | Vin. Cl. | 50/50 | 30 | 170 | 13.1 | −2 | 0.85 | 4.8 | +1.5 | +2.0 | ○ |
| E 16 | 0.16 | 140 | 53 | 1.5 | Vin. Cl. | 50/50 | 30 | 176 | 10.9 | 0 | 0.84 | 4.9 | +1.3 | +1.4 | ○ |

TABLE 1-continued

| | Sulfamate magnetic powder | | | Sulfamate in | | Resin ratio A/B | Curing agent (phr) | Coating material properties | | | | Surface roughness Ra (nm) | Electromagnetic char. | | Durability |
|---|---|---|---|---|---|---|---|---|---|---|---|---|---|---|---|
| | longer axis (μm) | σs (emu/g) | BET (m²/g) | Urethane resin per poly (A) | Other binder (B) | | | Glossiness (%) | vis/y.va × 10⁻² | Glossiness after 5 days | Rectangular ratio | | output (dB) | C/N (dB) | Head contamination |
| E 17 | 0.16 | 130 | 57 | 1.5 | Vin. Cl. | 50/50 | 30 | 175 | 12.2 | −1 | 0.84 | 5.1 | +1.3 | +1.2 | ○ |
| E 18 | 0.2 | 130 | 51 | 1.5 | Vin. Cl. | 50/50 | 30 | 169 | 12.9 | −2 | 0.85 | 5.3 | +0.8 | +0.9 | ○ |
| E 19 | 0.25 | 130 | 45 | 1.5 | Vin. Cl. | 50/50 | 30 | 167 | 14.0 | 0 | 0.86 | 5.3 | +0.6 | +0.7 | ○ |
| E 20 | 0.3 | 120 | 43 | 1.5 | Vin. Cl. | 50/50 | 30 | 160 | 14.5 | 0 | 0.86 | 5.5 | +0.5 | +0.5 | ○ |
| C 5 | 0.11 | 140 | 55 | SO₃Na-urethane | Vin. Cl. | 50/50 | 30 | 150 | 9.0 | −8 | 0.82 | 6.0 | 0.0 | 0.0 | Δ |
| C 6 | 0.08 | 140 | 58 |  | Vin. Cl. | 50/50 | 30 | 155 | 8.7 | −10 | 0.81 | 5.8 | +0.1 | −0.1 | Δ |
| C 7 | 0.11 | 140 | 55 | +COOH | Vin. Cl. | 50/50 | 30 | 142 | 8.3 | −11 | 0.81 | 5.8 | 0.0 | −0.1 | Δ |
| C 8 | 0.11 | 140 | 55 | +PO(OH)₂ | Vin. Cl. | 50/50 | 30 | 140 | 8.0 | −13 | 0.80 | 6.0 | −0.3 | −0.5 | Δ |
| E 21 | 0.11 | 140 | 55 | 1.5 | +SH Vin. Cl. | 50/50 | 30 | 167 | 12.9 | 0 | 0.85 | 5.1 | +1.2 | +1.2 | ○ |

*E: Example, C: Comparative Example, Example 13 Curing Agent: Coronate 2030, vis/y.va: viscosity/yield value, Vin. Cl.:vinyl chloride resin. +COOH: COOH containing resin. +PO(OH)₂: PO(OH)₂ containing resin. +SH Vin Cl.: SH containing vinyl chloride resin

TABLE 2

Non-magnetic Underlayer

| | Non-magnetic powder | | | | | Sulfamate in | | Resin ratio A/B | Curing agent (phr) | Non-magnetic Coating Material Properties | | | Surface roughness Ra (nm) | | Electromagnetic char. | |
|---|---|---|---|---|---|---|---|---|---|---|---|---|---|---|---|---|
| | longer axis (μm) | axis Ratio | BET (m²/g) | pH | Additional Ingredients | Urethane resin per poly (A) | Other binder (B) | | | Glossiness (%) | Viscosity (CP) | Glossiness after 5 days | Non-magnetic Underlayer | magnetic layer | output (dB) | C/N (dB) |
| E 22 | 150 | 7 | 49 | 8.7 | | 1.5 | Vin. Cl. | 50/50 | 20 | 160 | 195 | 0 | 2.8 | 3.0 | +1.8 | +2.6 |
| E 23 | 150 | 7 | 49 | 8.7 | | 0.5 | Vin. Cl. | 50/50 | 20 | 150 | 210 | −2 | 3.9 | 3.6 | +1.2 | +2.0 |
| E 24 | 150 | 7 | 49 | 8.7 | | 1 | Vin. Cl. | 50/50 | 20 | 153 | 203 | 0 | 3.7 | 3.6 | +1.4 | +2.1 |
| E 25 | 150 | 7 | 49 | 8.7 | | 2 | Vin. Cl. | 50/50 | 20 | 160 | 188 | 0 | 3.4 | 3.5 | +1.3 | +2.2 |
| E 26 | 150 | 7 | 49 | 8.7 | | 3 | Vin. Cl. | 50/50 | 20 | 158 | 211 | −1 | 3.6 | 3.8 | +1.1 | +1.9 |
| C 9 | 150 | 7 | 49 | 8.7 | | 4 | Vin. Cl. | 50/50 | 20 | 135 | 262 | −10 | 4.8 | 5.7 | −0.3 | −0.2 |
| C 10 | 150 | 7 | 49 | 8.7 | | 1.5 | Vin. Cl. | 80/20 | 20 | 148 | 237 | −5 | 4.6 | 5.2 | 0.0 | +0.2 |
| E 27 | 150 | 7 | 49 | 8.7 | | 1.5 | Vin. Cl. | 70/30 | 20 | 157 | 196 | 0 | 3.1 | 3.0 | +1.7 | +2.5 |
| E 28 | 150 | 7 | 49 | 8.7 | | 1.5 | Vin. Cl. | 30/70 | 20 | 157 | 201 | 0 | 3.6 | 3.5 | +1.2 | +1.9 |
| C 11 | 150 | 7 | 49 | 8.7 | | 1.5 | Vin. Cl. | 20/80 | 20 | 145 | 243 | −6 | 5.0 | 5.8 | −0.5 | −0.4 |
| E 29 | 150 | 7 | 49 | 8.7 | | 1.5 | Vin. Cl. | 50/50 | 10 | 159 | 182 | 0 | 2.7 | 3.1 | +1.8 | +2.4 |
| E 30 | 150 | 7 | 49 | 8.7 | | 1.5 | Vin. Cl. | 50/50 | 30 | 158 | 196 | 0 | 3.3 | 3.6 | +1.2 | +2.0 |
| E 31 | 150 | 7 | 49 | 8.7 | | 1.5 | Vin. Cl. | 50/50 | 40 | 157 | 198 | −2 | 3.7 | 3.8 | +1.1 | +1.9 |
| E 32 | 150 | 7 | 49 | 8.7 | | 1.5 | Vin. Cl. | 50/50 | 50 | 155 | 210 | −5 | 4.1 | 4.0 | +1.0 | +1.4 |
| C 12 | 150 | 7 | 49 | 8.7 | | 1.5 | Vin. Cl. | 50/50 | 60 | 153 | 213 | −13 | 5.1 | 5.8 | −0.4 | −0.4 |
| E 33 | 230 | 8 | 39 | 5.2 | | 1.5 | Vin. Cl. | 50/50 | 20 | 154 | 185 | −1 | 3.6 | 3.7 | +1.2 | +1.9 |
| E 34 | 30 | 1.1 | 35 | 5.2 | | 1.5 | Vin. Cl. | 50/50 | 20 | 150 | 196 | −2 | 4.0 | 3.8 | +1.0 | +1.7 |
| C 13 | 150 | 7 | 49 | 8.7 | | SO₃Na-urethane | Vin. Cl. | 50/50 | 20 | 145 | 246 | −10 | 4.5 | 5.3 | 0.0 | 0.0 |
| E 35 | 150 | 7 | 49 | 8.7 | *2) Carbon | 1.5 | Vin. Cl. | 50/50 | 20 | 158 | 200 | 0 | 3.0 | 3.2 | +1.8 | +2.5 |
| E 36 | *1) 100 | 5 | 55 | 8.7 | *2) Carbon | 1.5 | Vin. Cl. | 50/50 | 20 | 157 | 205 | 0 | 2.9 | 3.1 | +1.7 | +2.5 |

*1) Titan onide, Titan onide/Carbon = 60/40
*2) Carbon (longer axis = 30 nm, BET = 70 m²/g), Non-magnetic powder/Carbon = 60/40

TABLE 3

| | Backcoat layer | | | | | | | | | | | | | Non-magnetic Coating Material Properties | | | Surface roughness Ra (nm) | | Electromagnetic char. | |
|---|---|---|---|---|---|---|---|---|---|---|---|---|---|---|---|---|---|---|---|---|
| | Carbon 1 | | Carbon 2 | | Inorganic Particle | | Carbon 1/2/ Inorganic Particle | Sulfamate in Urethane resin | Other binder | Resin ratio | Curing agent | Gloss- | Vis- | Stability Glossiness | | | mag- | | |
| | A.D. (nm) | BET (m²/g) | A.D. (nm) | BET (m²/g) | kind | A.D. (nm) | weight ratio | per poly (A) | (B) | A/B | (phr) | iness (%) | wsity (CP) | after 5 days | Backcoat layer | netic layer | out- put (dB) | C/N (dB) |
| E 37 | 20 | 220 | 350 | 8 | α-Fe₂O₃ | 100 | 80/1/1 | 0.5 | Vin. Cl. | 50/50 | 20 | 118 | 18 | 0 | 16.0 | 5.5 | +0.8 | +1.0 |
| E 38 | 20 | 220 | 350 | 8 | α-Fe₂O₃ | 100 | 80/1/1 | 1 | Vin. Cl. | 50/50 | 20 | 122 | 18 | 0 | 14.2 | 5.3 | +0.9 | +1.1 |
| E 39 | 20 | 220 | 350 | 8 | α-Fe₂O₃ | 100 | 80/1/1 | 1.5 | Vin. Cl. | 50/50 | 20 | 125 | 17 | 0 | 14.0 | 5.0 | +1.4 | +1.4 |
| E 40 | 20 | 220 | 350 | 8 | α-Fe₂O₃ | 100 | 80/1/1 | 2 | Vin. Cl. | 50/50 | 20 | 125 | 18 | 0 | 14.0 | 5.2 | +1.3 | +1.2 |
| E 41 | 20 | 220 | 350 | 8 | α-Fe₂O₃ | 100 | 80/1/1 | 3 | Vin. Cl. | 50/50 | 20 | 124 | 20 | 0 | 15.5 | 5.5 | +1.0 | +0.8 |
| C 14 | 20 | 220 | 350.8 | α-Fe₂O₃ | 100 | 80/0/1 | 4 | Vin.Cl. 50/50 | | 20 | 93 | 32 | −12 | 32.5 | 7.3 | −0.8 | −1.0 | −0.6 |
| E 42 | 20 | 220 | 350 | 8 | α-Fe₂O₃ | 100 | 80/1/1 | 1.5 | Vin. Cl. | 80/20 | 20 | 117 | 27 | −8 | 28.0 | 6.8 | −0.4 | −0.6 |
| E 43 | 20 | 220 | 350 | 8 | α-Fe₂O₃ | 100 | 80/1/1 | 1.5 | Vin. Cl. | 70/30 | 20 | 125 | 19 | 0 | 14.3 | 5.2 | +1.4 | +1.5 |
| C 16 | 20 | 220 | 350 | 8 | α-Fe₂O₃ | 100 | 80/1/1 | 1.5 | Vin. Cl. | 30/70 | 20 | 124 | 20 | 0 | 15.3 | 5.5 | +1.1 | +1.0 |
| E 44 | 20 | 220 | 350 | 8 | α-Fe₂O₃ | 100 | 80/1/1 | 1.5 | Vin. Cl. | 20/80 | 20 | 110 | 30 | −10 | 29.5 | 7.1 | −0.6 | −0.8 |
| E 45 | 20 | 220 | 350 | 8 | α-Fe₂O₃ | 100 | 80/1/1 | 1.5 | Vin. Cl. | 50/50 | 10 | 124 | 18 | 0 | 13.5 | 5.0 | +1.6 | +1.7 |
| E 46 | 20 | 220 | 350 | 8 | α-Fe₂O₃ | 100 | 80/1/1 | 1.5 | Vin. Cl. | 50/50 | 30 | 125 | 20 | 0 | 15.6 | 5.5 | +1.2 | +1.3 |
| E 47 | 20 | 220 | 350 | 8 | α-Fe₂O₃ | 100 | 80/1/1 | 1.5 | Vin. Cl. | 50/50 | 40 | 123 | 23 | −3 | 16.0 | 5.8 | +0.7 | +0.9 |
| C 17 | 20 | 220 | 350 | 8 | α-Fe₂O₃ | 100 | 80/1/1 | 1.5 | Vin. Cl. | 50/50 | 50 | 120 | 24 | −5 | 17.5 | 5.9 | +0.6 | +0.8 |
| E 48 | 20 | 220 | 350 | 8 | α-Fe₂O₃ | 100 | 80/1/1 | 1.5 | Vin. Cl. | 50/50 | 60 | 110 | 27 | −15 | 26.5 | 7.6 | −1.0 | −1.3 |
| E 49 | 20 | 220 | 350 | 8 | α-Fe₂O₃ | 100 | 80/1/1 | 1.5 | Nitrocell. | 50/50 | 20 | 128 | 21 | 0 | 14.6 | 5.3 | +1.3 | +1.4 |
| E 50 | 20 | 220 | 350 | 8 | α-Fe₂O₃ | 100 | 80/1/1 | 1.5 | Butyral | 50/50 | 20 | 120 | 23 | 0 | 14.8 | 5.4 | +1.2 | +1.2 |
| E 51 | 17 | 210 | 350 | 8 | α-Fe₂O₃ | 100 | 80/1/1 | 1.5 | Acryl | 50/50 | 20 | 122 | 22 | 0 | 14.5 | 5.2 | +1.5 | +1.4 |
| E 52 | 25 | 200 | 350.8 | α-Fe₂O₃ | 100 | 80/1/1 | 1.5 | Vin. Cl. 50/50 | | 20 | 130 | 20 | 0 | 13.0 | 4.8 | +1.7 | +1.8 | |
| C 18 | 20 | 220 | 350 | 8 | α-Fe₂O₃ | 100 | 1.5 | Vin.Cl. SO₃Na-urethane | 50/50 | 20 | 121 | 0 | 15.0 | 5.5 | +1.3 | +1.4 | +1.8 |
| E 53 | 30 | 85 | — | — | — | — | 80/0/0 | 1.5 | Vin. Cl. | 50/50 | 20 | 125 | 18 | 0 | 13.5 | 4.9 | +1.6 | +1.6 |
| E 54 | 17 | 210 | 122 | 12 | — | — | 80/1 | 1.5 | Vin. Cl. | 50/50 | 20 | 133 | 17 | 0 | 13.0 | 4.7 | +1.7 | +1.8 |

A.D.:Average diameter, Nitrocell.: nitro cellulose resin, Butyral: butyral resin, Acryl: acryl resin

TABLE 4

| | Magnetic layer | | | Non-magnetic underlayer | | | Backcoat layer | | | Surface roughness Ra (nm) | | | Electromagnetic characteristics | |
|---|---|---|---|---|---|---|---|---|---|---|---|---|---|---|
| | binder | thickness (μm) | Curing Agent (phr) | binder | thickness (μm) | Curing Agent (phr) | binder | thickness (μm) | Curing Agent (phr) | Magnetic layer | Non-magnetic underlayer | Backcoat layer | output (dB) | C/N (dB) |
| E 55 | A/B = 50/50 | 3.0 | 30 | — | — | — | A/B = 50/50 | 0.8 | 20 | 4.6 | — | 14.0 | +1.6 | +2.1 |
| E 56 | A/B = 50/50 | 0.5 | 30 | A/B = 50/50 | 2.0 | 20 | C/B = 50/50 | 0.8 | 20 | 3.8 | 2.8 | 15.5 | +1.2 | +1.8 |
| E 57 | A/B = 50/50 | 0.5 | 30 | C/B = 50/50 | 2.0 | 20 | A/B = 50/50 | 0.8 | 20 | 4.0 | 4.5 | 14.0 | +1.0 | +1.4 |
| E 58 | C/B = 50/50 | 0.5 | 30 | A/B = 50/50 | 2.0 | 20 | A/B = 50/50 | 0.8 | 20 | 2.9 | 2.8 | 14.0 | +1.9 | +2.6 |
| E 59 | A/B = 50/50 | 0.5 | 30 | A/B = 50/50 | 2.0 | 20 | A/B = 50/50 | 0.8 | 20 | 2.8 | 2.8 | 14.0 | +2.0 | +2.7 |

*A = Polyurethane resin used in Example 3 (Sulfamate = 1.5/poly)
*B = Vinyl chloride resin used in Example 1
*C = Polyurethane resin used in Comparative Example 5 (Number of $SO_3Na$ = 2.0/poly)
*With respect to Electromagnetic characteristics of Example 55, value of Comparative Example 5 is taken as standard.
*With respect to Electromagnetic characteristics of Example 56–59, value of Comparative Example 13 is taken as standard.

In the magnetic recording medium of the present invention, a resin having a group which contains metal sulfamate is used as a binder. This makes it possible to increase adsorption to magnetic powder compared with the binder used in the past, and to improve coating material dispersion property and coating material stability and to provide higher magnetic characteristics. Also, it is possible to provide a magnetic recording medium having high electromagnetic characteristics and durability, and to provide better coating property and higher surface property of the medium because coating material viscosity is decreased. Using the binder having a group which contains metal sulfamate, a non-magnetic underlayer and a back-coat layer are formed. As a result, a magnetic recording medium having higher electromagnetic characteristics can be obtained.

What is claimed is:

1. A magnetic recording medium comprising a magnetic layer having a metal magnetic powder comprising at least one of Al, Si, P, Y or rare earth element, and a binder as major components; a non-magnetic layer disposed between a magnetic layer and one surface of non-magnetic support; and a back-coat layer disposed on an opposite surface of the support, said non-magnetic layer comprises a binder which has a vinyl chloride copolymer, a polyurethane resin having a group which contains metal sulfamate as a functional group, and agent, said urethane resin comprises 0.5 to 3 groups containing metal sulfamate per molecule, blending weight ratio of said vinyl chloride copolymer and said polyurethane resin is 30/70 to 70/30, and said curing agent is contained by 10 to 50 weight parts to 100 weight parts of the total of said vinyl chloride copolymer and said polyurethane resin.

2. A magnetic recording medium according to claim 1, further said backcoat layer comprises a binder which has a vinyl chloride copolymer, a polyurethane resin having a group which contains metal sulfamate as a functional group, and a curing agent, said urethane resin comprises 0.5 to 3 groups containing metal sulfamate per molecule, blending weight ratio of said vinyl chloride copolymer and said polyurethane resin is 30/70 to 70/30, and said curing agent is contained by 10 to 50 weight parts to 100 weight parts of the total of said vinyl chloride copolymer and said polyurethane resin.

* * * * *